(12) United States Patent
Kalkstein

(10) Patent No.: US 11,371,592 B2
(45) Date of Patent: Jun. 28, 2022

(54) CONTINUOUSLY VARIABLE-RATIO TRANSMISSION

(71) Applicant: James Leslie Kalkstein, Rochester Hills, MI (US)

(72) Inventor: James Leslie Kalkstein, Rochester Hills, MI (US)

(\*) Notice: Subject to any disclaimer, the term of this patent is extended or adjusted under 35 U.S.C. 154(b) by 0 days.

(21) Appl. No.: 17/375,550

(22) Filed: Jul. 14, 2021

(65) Prior Publication Data
US 2022/0018422 A1    Jan. 20, 2022

Related U.S. Application Data

(60) Provisional application No. 63/052,522, filed on Jul. 16, 2020.

(51) Int. Cl.
*F16H 9/10* (2006.01)
*F16H 55/54* (2006.01)

(52) U.S. Cl.
CPC .............. *F16H 9/10* (2013.01); *F16H 55/54* (2013.01)

(58) Field of Classification Search
CPC .................................. F16H 9/10; F16H 55/54
USPC ...................................................... 474/47, 28
See application file for complete search history.

(56) References Cited

U.S. PATENT DOCUMENTS

| | | | | |
|---|---|---|---|---|
| 359,098 A | * | 3/1887 | Rose ........................ | F16H 9/10 474/55 |
| 792,220 A | * | 6/1905 | Johnston ................. | F16H 55/54 474/54 |
| 1,160,414 A | * | 11/1915 | Kelsey ...................... | F16H 9/10 474/55 |
| 1,440,462 A | * | 1/1923 | Healey ...................... | F16H 9/24 474/56 |
| 1,446,294 A | * | 2/1923 | Healey ...................... | F16H 9/10 474/54 |
| 1,523,241 A | * | 1/1925 | Backman .................. | F16H 9/10 474/55 |
| 2,552,179 A | * | 5/1951 | Kamp ....................... | F16H 9/10 474/54 |
| 2,645,946 A | * | 7/1953 | Schleif ..................... | F16H 9/10 474/55 |
| 2,697,360 A | * | 12/1954 | Sampietro ................ | F16H 9/10 474/51 |

(Continued)

*Primary Examiner* — Henry Y Liu
(74) *Attorney, Agent, or Firm* — Dinsmore & Shohl LLP

(57) ABSTRACT

A continuously variable transmission including an input pulley having a first subassembly supported upon a first rotatably driven shaft and an output pulley having a second subassembly supported upon a second rotatable shaft. Each subassembly includes a plurality of left link elements extending from segmented pulley segments to a first shaft supported rotating element, along with a plurality of right link elements extending from the segmented pulley segments to a second shaft supported rotated element for positioning the segmented pulley segments in an outwardly circumferentially arrayed fashion about each of the first and second shafts. Axial displacement of a first and second pairs of said first and second shaft supporting elements in each of the input and output pulley subassemblies inversely varying a collective diameter formed by said arrangements of segmented pulley segments in order to maintain a constant circumference of a belt supported about the segmented pulley segments for each of the input and output pulleys.

5 Claims, 7 Drawing Sheets

(56) References Cited

U.S. PATENT DOCUMENTS

| | | | | |
|---|---|---|---|---|
| 2,700,902 | A * | 2/1955 | Sampietro | F16H 61/662 474/51 |
| 4,024,772 | A * | 5/1977 | Kumm | F16H 55/52 474/54 |
| 4,068,539 | A * | 1/1978 | Nyc | F16H 9/10 474/50 |
| 4,129,044 | A * | 12/1978 | Erickson | F16H 9/10 280/236 |
| 4,295,836 | A * | 10/1981 | Kumm | F16H 61/66227 474/51 |
| 4,409,862 | A * | 10/1983 | Adkins | F16H 9/10 475/211 |
| 4,498,351 | A * | 2/1985 | Ahoor | F16H 9/10 474/49 |
| 4,529,394 | A * | 7/1985 | Ybern Miro | F16H 9/10 474/49 |
| 4,608,034 | A * | 8/1986 | Reswick | F16H 9/10 474/49 |
| 4,768,996 | A * | 9/1988 | Kumm | F16H 9/10 474/49 |
| 4,781,656 | A * | 11/1988 | Brackett | F16H 9/10 474/39 |
| 4,810,234 | A * | 3/1989 | Kumm | F16H 55/54 474/49 |
| 4,824,419 | A * | 4/1989 | Kumm | F16H 9/10 474/49 |
| 4,938,732 | A * | 7/1990 | Krude | F16H 9/10 474/56 |
| 5,011,458 | A * | 4/1991 | Kumm | F16H 37/0846 477/41 |
| 5,443,423 | A * | 8/1995 | Ha | F16H 55/52 474/49 |
| 5,547,428 | A * | 8/1996 | Matsuda | F16H 9/10 474/51 |
| 5,637,046 | A * | 6/1997 | Ha | F16H 9/10 474/70 |
| 5,830,093 | A * | 11/1998 | Yanay | F16H 9/10 474/49 |
| 6,379,275 | B1 * | 4/2002 | Serkh | F16G 5/16 474/49 |
| 6,497,634 | B1 * | 12/2002 | Bode | F16H 3/42 474/139 |
| 7,077,771 | B2 * | 7/2006 | Jeng | F16H 9/24 474/49 |
| 7,261,655 | B2 * | 8/2007 | Vargas | F16H 55/54 474/49 |
| 7,951,027 | B2 * | 5/2011 | An | F16H 9/10 474/54 |
| 9,334,944 | B2 * | 5/2016 | Appleton | F16H 9/10 |
| 9,803,728 | B2 * | 10/2017 | Dewangan | F16H 9/10 |
| 2002/0091026 | A1 * | 7/2002 | Tay | F16H 9/10 474/83 |
| 2005/0202912 | A1 * | 9/2005 | Tay | F16H 63/062 474/83 |
| 2005/0288137 | A1 * | 12/2005 | Vargas | F16H 55/54 474/49 |
| 2006/0252589 | A1 * | 11/2006 | Tay | F16H 63/067 474/49 |
| 2007/0087875 | A1 * | 4/2007 | Weaver | F16H 55/54 474/49 |
| 2009/0069132 | A1 * | 3/2009 | Tay | F16H 9/08 474/83 |
| 2009/0270209 | A1 * | 10/2009 | Lindkvist | F16H 9/20 474/30 |
| 2010/0222166 | A1 * | 9/2010 | An | F16H 9/10 474/50 |
| 2010/0272571 | A1 * | 10/2010 | Yonge | B62M 9/08 474/49 |
| 2011/0059821 | A1 * | 3/2011 | Lee | F16H 55/56 474/8 |
| 2012/0238384 | A1 * | 9/2012 | Lee | F16H 9/10 474/25 |
| 2016/0040772 | A1 * | 2/2016 | Appleton | F16H 55/54 474/55 |
| 2016/0138687 | A1 * | 5/2016 | Tange | F16H 9/24 474/53 |
| 2017/0184184 | A1 * | 6/2017 | Tange | F16H 55/54 |
| 2017/0328447 | A1 * | 11/2017 | Tange | F16H 55/30 |
| 2017/0328448 | A1 * | 11/2017 | Tange | F16H 9/24 |
| 2018/0231108 | A1 * | 8/2018 | Akbari Rostami | F16H 9/10 |

* cited by examiner

CONTINUOUSLY VARIABLE-RATIO TRANSMISSION

CROSS REFERENCE TO RELATED APPLICATIONS

The present application claims the priority of U.S. Ser. No. 63/052,522 filed Jul. 16, 2020.

FIELD OF THE INVENTION

The present invention relates generally to a continuously variable-ratio transmission (CVT) which has the capability of varying speed and torque multiplication ratios between an input source and an output source over a wide range of multiplication ratios, and without being restricted to fixed ratios.

BACKGROUND OF THE INVENTION

Continuously variable transmissions are known in the prior art, and which are most broadly defined as an automatic transmission which can change seamlessly through a continuous range of gear ration. This is in contrast with other transmission designs provide a limited number of gear rations in fixed steps. In this fashion, the flexibility of a CVT with suitable control may allow an associated engine to operate at a constant RPM, and while the vehicle moves at varying speeds.

Most state-of-the-art CVT's use some method of varying the diameter ratio between the input source and the output source. In certain applications, the machine varies the ratio via hydro-static drive mechanisms that use an inherently different approach. Most CVT's rely on some form of contact friction, that is often subject to the limits of contact mechanics and mechanical friction. Some techniques use contact friction between a rolling element and a mechanical shape that can be varied to achieve a given ratio change. Other systems utilize a steel or fabric belt squeezed between two sheaves to provide friction force sufficient to transmit a given level of torque.

In virtually all cases the limiting factor is the contact mechanics of the interfacing materials. Often the ability to transmit torque is limited to the contact forces and the friction available. Generally speaking, and including the hydro-static concepts, this leads to certain limitations in efficiency, difficult lubrication requirements and low tolerance for shock-loading or temporary over-loading (less so in hydro-static systems). The lubrication challenges can be formidable as well, since adding lubrication often reduces friction, further understanding that transmitting high torque requires high friction.

Other examples drawn from the prior art include the continuously variable transmission with fragmentary pulleys and a plain belt, US 2018/0231108 for accomplishing a smooth change in speed ratio in such as an automobile gear box, motorcycle, bicycle or other system that is designed for transferring power which is subject to change in ratio. A fragmentary pulley is made up of 10, 20, 24, 36 fragments which can move on path toward the center of the pulley for varying the diameter of the pulley and concurrently changing the gear ratio as a result of this movement. Upon the input pulley working with its smallest diameter, the secondary pulley will be working with its biggest diameter. Occurrence of greater speed causes the input pulley to expand and the output pulley to contract.

Other relevant examples include the expansion wheel of Rose, US 359,098 which teaches gearings for conveying rotary motion utilizing a variable gear ratio, or for reversing rotary motion, a pair of wheels or hubs supported upon a shaft B. Slidably supported arms C extend from a central hub A supported about the shaft B to an outer belt or pulley supported head D. Also provided are a series of levers F interconnecting the outer supported sliding heads D with additional hubs E slidably positioned upon the shaft B on opposite sides of the central hub A. Additional linkages are provided and which, collectively, permit a pair of the wheels or hubs to be interconnected by a common belt or pulley and such that enlargement of a first hub cooperates with concurrent diminishing of the second hub.

SUMMARY OF THE INVENTION

The present invention discloses a Continuously Variable-Ratio Transmission that contain all the benefits of a standard-type mechanical drive belt system (e.g. v-belt, round-belt or flat-belt or other types of belt-drive systems) while still maintaining the potential for CVT operation. Some of the typical benefits of a standard-type mechanical belt-drive system include high-efficiency, simplicity, relatively low-cost, shock-load tolerance, NVH (noise, vibration and harshness) isolation, and no lubrication requirements, and which significantly increases the possible uses for a CVT-type transmissions.

A mechanical belt-drive system is provided with the ability to vary each of input and output pulley diameters in simultaneous fashion so that the overall inner circumference length of an associated belt or chain remains constant. The type of mechanical belt-drive system is independent of the design and can include any of a V-Belt, a round-belt, flat-belt or a timing-type belt. Varying the pulley diameters is accomplished with use of a segmented pulley designed to vary its diameter by moving a center-rotating elements in-line to an axis of rotation of a supporting shaft, such that the segments become diametrically larger or smaller as required.

The present invention includes an input pulley having a first subassembly supported upon a first rotatably driven shaft and an output pulley having a second subassembly supported upon a second rotatable shaft. The input and output pulley subassemblies each further include a plurality of left link elements extending from segmented pulley segments to a first shaft supported rotating element, along with a plurality of right link elements extending from the segmented pulley segments to a second shaft supported rotated element for positioning the segmented pulley segments in an outwardly circumferentially arrayed fashion about each of the first and second shafts.

Axial displacement of a first pair of the first and second shaft supporting elements in the input pulley subassembly varying a collective diameter formed by the arrangement of segmented pulley segments configured upon the input pulley subassembly. Axial displacement of a second pair of the first and second shaft supporting elements in the output pulley subassembly being inversely varied with the displacement of the first pair of shaft supporting elements for reciprocally varying a collective diameter formed by said arrangement of segmented pulley segments configured upon the output pulley subassembly, and in order to maintain a constant circumference of a belt supported about the segmented pulley segments for each of the input and output pulleys.

Additional features include a controller designed to move each of input and output variators in such a way that they move opposite of one another, causing the diameter of one pulley to enlarge in diameter, and the other pulley to correspondingly decrease in diameter or vice-versa. The net effect of this change causes the machine to go from an under-drive ratio to an over-drive ratio or back in a smooth and continuously manner.

Other features include arrangements of large rings, these forming a surrounding cage, which is configured about each of the input and output pulleys, these constraining the radial individual motion of each of the segmented pulleys in each of diameter enlarging and contracting directions. Movement of the center rotating elements can utilize any type of mechanical, electro-mechanical, pneumatic or hydraulic actuation. The torque transmission capability of the present design is similar in practice to a mechanical belt-type drive system and contains all the benefits of a standard-type mechanical drive belt system (e.g. v-belt, round-belt or flat-belt or other types of belt-drive systems) while still maintaining the potential for CVT operation. Some of the typical benefits of a standard-type mechanical belt-drive system are realized by the present design and include high-efficiency, simplicity, relatively low-cost, shock-load tolerance, NVH isolation, and no lubrication requirements.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
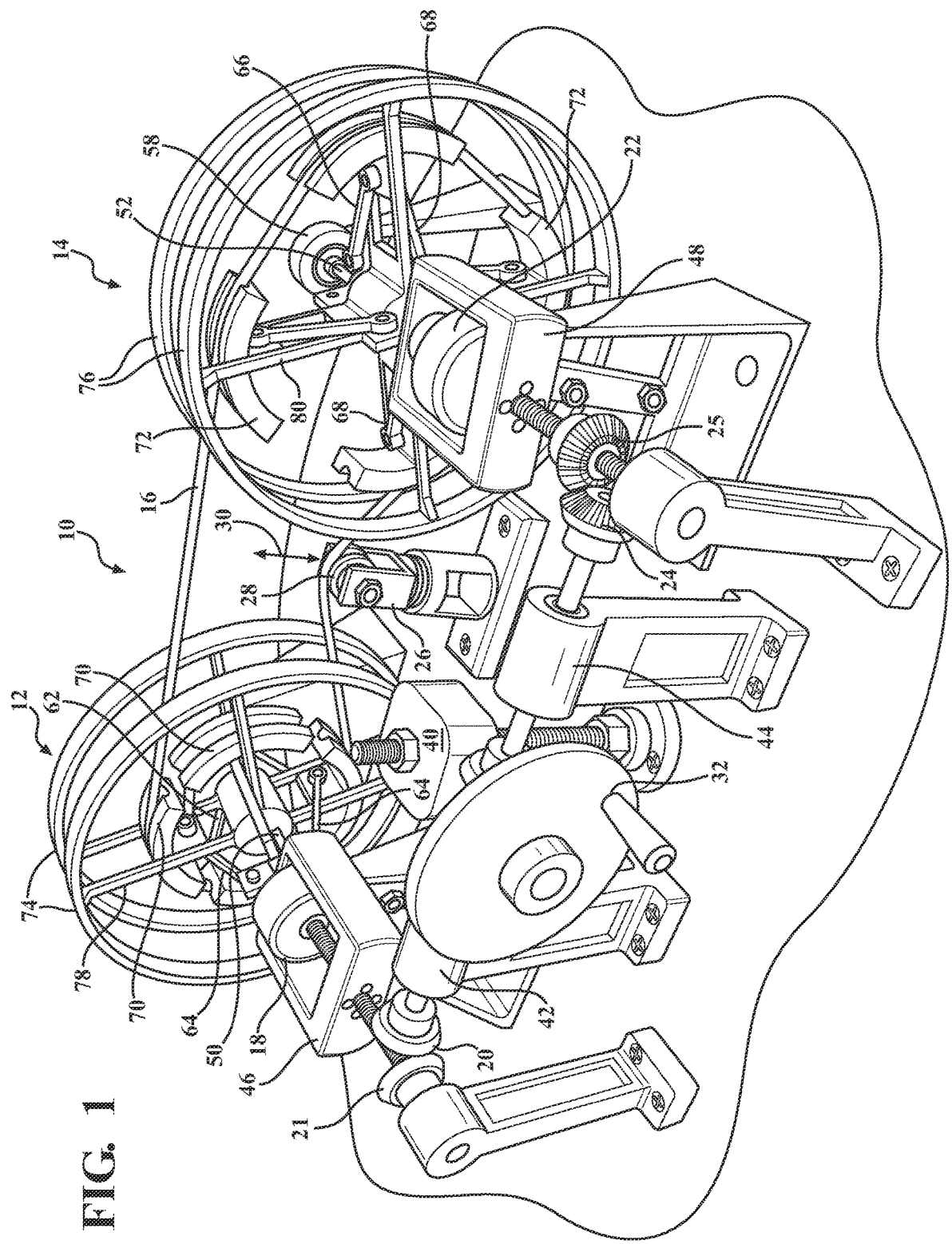
FIG. 1 is a perspective illustration of the continuously variable transmission according to a non-limiting embodiment of the present invention and illustrating an under-drive configuration.

With reference to the attached illustrations, the present invention discloses a continuously variable transmission of improved design, see as generally referenced at 10 in FIG. 1. As will be further described, the continuously variable transmission (CVT) provides the capability to vary the speed and torque multiplication ratio established between an input source and an output source over a wide range of multiplication ratios, and without being restricted to fixed ratios.

The present invention further provides for a CVT which possesses all of the benefits of a standard-type mechanical drive belt system, notably high-efficiency, simplicity, relatively low cost, shock-load tolerance, NVH (noise, vibration and harshness) isolation and minimal to no lubrication requirements.

Figure 2:
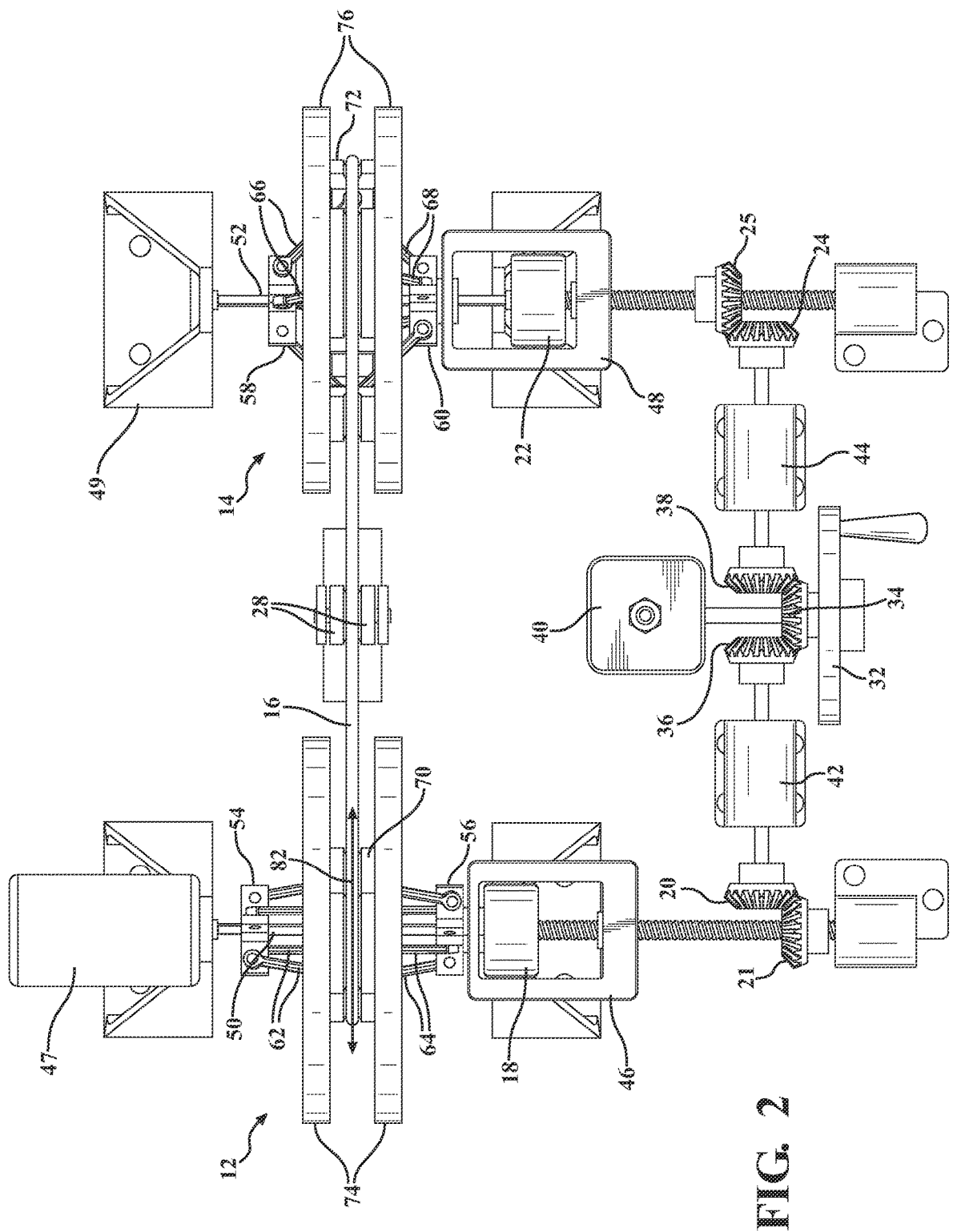
FIG. 2 is an overhead plan view of the continuously variable transmission of FIG. 1.

By way of explanation, FIGS. 1 and 2 provide a pair of perspective and overhead plan views of a continuously variable transmission assembly which, for purposes of the present description, is depicted in jig supported table top configuration, it being further understood that the CVT assembly of the present invention is amenable to being incorporated into any powertrain application not limited to electric, internal combustion, plug-in-hybrid or fuel cell related vehicular applications. As will be further described, and in any CVT application within the scope of the invention, an arrangement of input/output pulleys, pulley segments and associated constraining cage/rings, cross-link arms and pulley links are provided for enabling continuous, incremental and inverse diameter adjusting motion of both the input and output pulleys in order to provide a range of operation of the CVT assembly between underdrive (i.e. input pulley is at a diameter less than the output pulley) and overdrive (input pulley is at a diameter greater than the output pulley) positions.

With reference again to FIG. 1, a perspective illustration is provided, again generally at 10, of the continuously variable transmission according to a non-limiting embodiment of the present invention and illustrating an under-drive configuration. FIG. 2 again provides a corresponding overhead plan view of the continuously variable transmission of FIG. 1 and further illustrates portions of the rear axial shaft supporting structure not shown in FIG. 1 (for purposes of ease of illustration).

A first or input pulley subassembly is generally referenced at 12, along with a corresponding output pulley subassembly 14. A belt, see at 16, is supported upon each of the input 12 and output 14 pulleys and itself can include any closed loop construction not limited to nylon, aluminum, steel or composites thereof. The general definition of belt 16 is further intended to include such as closed loop defined chains or the like.

Additional components illustrated in the broad overview of FIG. 1 include each of variable controller components, these including an input pulley located variator/controller 18 and gearbox subassembly (input gear 20 and beveled output gear 21) associated with the input pulley subassembly, along with an output pulley located variator/controller 22 and gearbox subassembly (input gear 24 and beveled output gear 25) corresponding to the output subassembly 14. An idler component 26 is positioned between the input 12 and output 14 pulley subassemblies and includes a vertically actuating support with an upper positioned set of rollers 28 (see also FIG. 2) in contact with an exterior circumference of the belt 16. The idler component 26 is communicated with the variator controllers on both the input and output pulleys such that the rollers 28 are actuated in either of up and down directions (see bi-directional arrow 30 in FIG. 1) in order to compensate for any centerline distance error in order to establish the proper belt tension, as well as to absorb any slack in the belt simultaneous with the inverse diameter adjusting motion of the variator controllers on both the input and output pulley subassemblies.

For demonstration purposes, a hand crank wheel 32 is depicted which, upon being actuated, inversely actuates each of the input 18 and output 20 pulley side variator controllers via their respective beveled gear configurations 20/21 and 24/25. As best shown in in the overhead view of FIG. 2, an input bevel gear 34 is depicted on a rear side of the hand crank 32 and in turn feeds first 36 and second 38 takeoff bevel gears which are in turn respectively connected to each of the variator controller input gears 20 and 24 associated with the input and output pulley subassemblies. Without limitation, the hand cranks wheel 32 depicted is understood to be substitute-able by any mechanical, electro-mechanical, pneumatic or hydraulic input for providing the desired inverse actuation of the input and output pulley subassemblies.

Also generally referenced in FIGS. 1 and 2 are a combination of general structural supports of non-specific and non-limiting composition and include such as at 40 for structurally supporting the hand crank wheel 32 and associated bevel gear 34, at 42 for interconnecting the first take off bevel gear 36 with the bevel gears 20/21 of the first variator controller 18, and at 44 for interconnecting the second take off bevel gear 38 with the bevel gears 24/25 of the second variator controller 22. Also shown are additional supports at 46 and 48 in FIGS. 1 and 2 for respectively supporting each of the first 18 and second 22 variator controller components.

Further depicted in FIG. 2 at 47 is a rotary inducing input source (such as an electric motor) for driving input pulley 12, with the output pulley 14 in turn feeding a rotary output (at 49) according to either of an underdrive or overdrive ratio as will be further described herein.

Having undertaken a general explanation of much of the supporting structure associated with the CVT transmission, reference again is made to the input pulley 12 and output pulley 14 subassemblies. Each of the pulleys 12/14 incorporates a rotatably driven shaft, respectively shown at 50 for input pulley 12 and at 52 for output pulley 14. Although not clearly shown, the shafts 50/52 are understood to be each non-circular in cross section, typically square or according to some other polygonal configuration, and in order to rotatably slave each of first and second pairs of shaft supported rotating elements (at 54/56 for input pulley 12 and further at 58/60 for output pulley 14 as best shown in FIG. 2) such that the shaft supported and rotating elements can be axially displaced (reference further being made to FIGS. 6 and 7 for selected elements 58/60) relative to one another.

The input 12 and output 14 pulley subassemblies each further including pluralities of left and right link elements, these shown at 62/64 for input pulley 12 and further at 66/68 for output pulley 14. The pairs of link elements extend from a plurality of pulley segments associated with each of the axially spaced apart first and second pairs 54/56 and 58/60 of shaft supported rotating elements. The pluralities of pulley segments are shown at 70 for the input pulley 12 and at 72 for the output pulley 72 (these each including a circumferentially directed and arcuate middle channel for seating the belt 16), with the left/right pluralities of link arms 62/64 and 66/68 being pivotally connected at opposite ends to each of the shaft supported rotating and axially displacing elements 54/56 and 58/60 and the respective pluralities of pulley segments 70 and 72 in an outwardly circumferentially arrayed fashion about each of the first 50 and second 52 keyed shafts.

As further shown, a plurality of four individual and circumferentially spaced apart pulley segments 70 and 72 are illustrated for each of the input 12 and output 14 pulleys, with the understanding that other pluralities of individual segments can be provided according to further redesigned variants of the present invention. Axial displacement of the first pair 54/56 of the shaft supporting elements of the input pulley subassembly 12 varies a collective diameter formed by the arrangement of segmented pulley segments 70 configured upon the input pulley subassembly. Concurrent axial displacement of the second pair of said shaft supporting elements 58/60 (see also FIGS. 6-7) in the output pulley subassembly 14 inversely varies with the displacement of the first pair of shaft supporting elements 54/56 for reciprocally varying a collective diameter formed by the arrangement of the pulley segments 72 configured upon the output pulley subassembly, this again in order to maintain a constant circumference of the belt supported about the segmented pulley segments for each of the input and output pulleys.

Other features include a restraining cage including a plurality of rings (see spaced apart pairs 74 and 76) configured about each of the input 12 and output 14 pulleys for constraining radial motion of the pluralities of circumferential arrayed segmented pulleys 70 and 72 during both collective diameter enlarging and contracting motion. The cage/ring arrays 74/76 each further include radial supports (see respectively at 78 and 80) which circumferentially align with each of the pulley segments 70 and 72 (see as best shown in each of FIGS. 3-5) and in order to provide guided and constrained radially directed motion of each of the input/output pulley segments between each of minimum and maximum pulley diameter defining positions.

Figure 3:
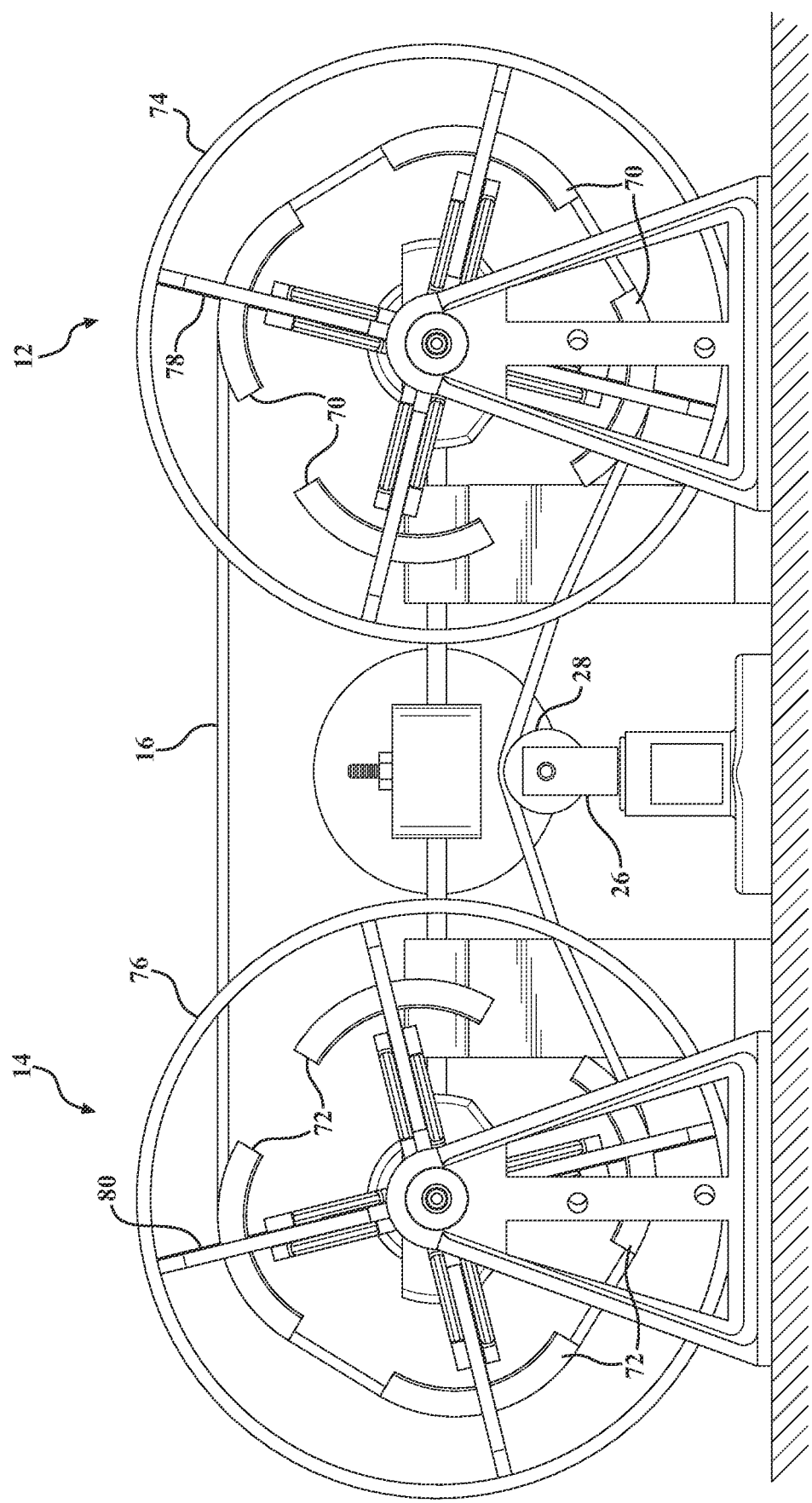
FIG. 3 is a side plan view of the continuously variable transmission and illustrating both the input and output pulleys in an intermediate collective diameter defining position shown approximately one hundred and eighty degrees rotated from FIGS. 1-2 so that the input pulley is located on the right side and the output pulley being on the left side.
Figure 4:
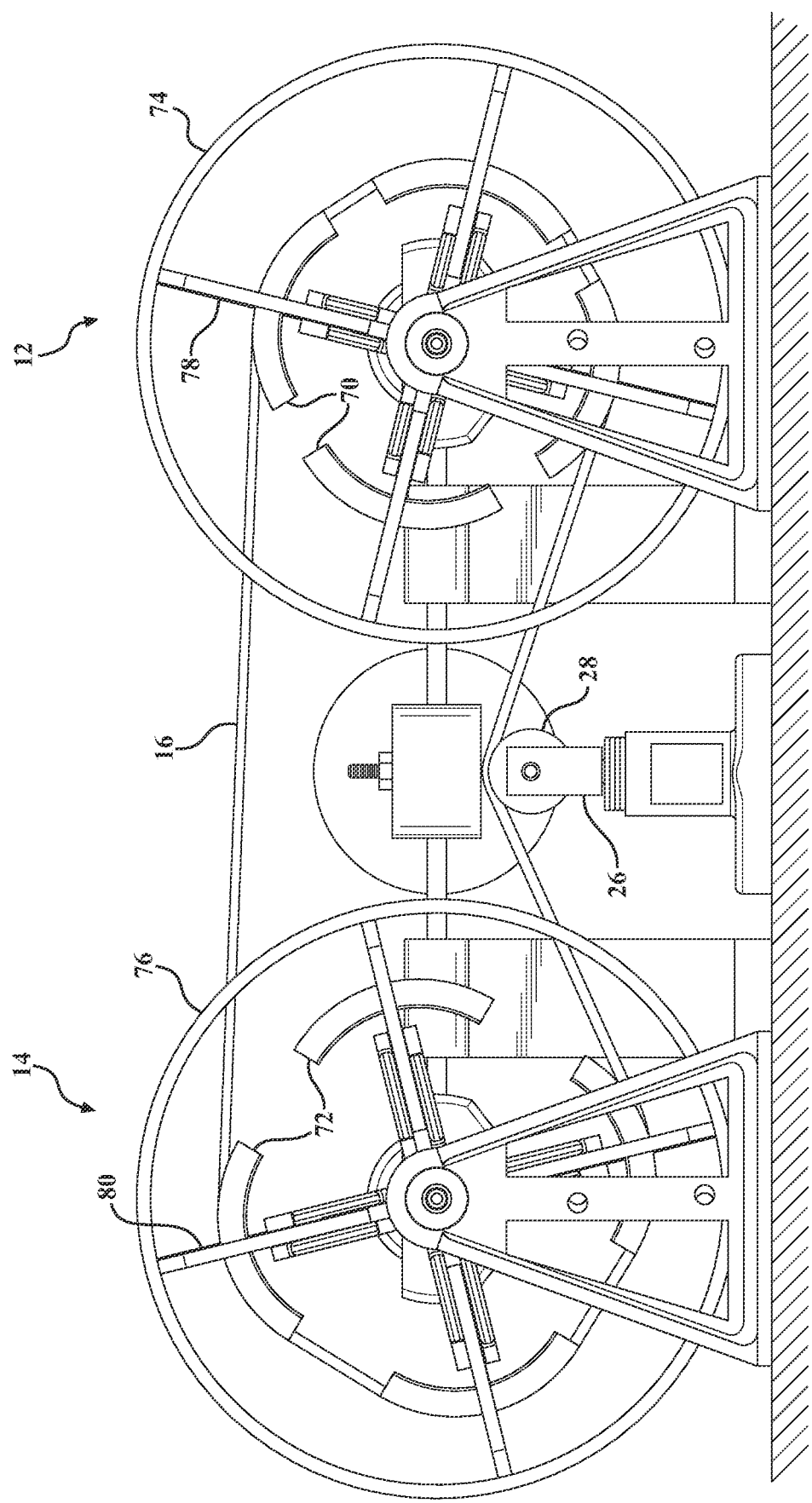
FIG. 4 is a succeeding illustration to FIG. 3 and showing the output pulley diameter defining pulley segments in a maximum diameter defining position corresponding to an underdrive position, the input pulley segments corresponding to a minimum diameter defining position.
Figure 5:
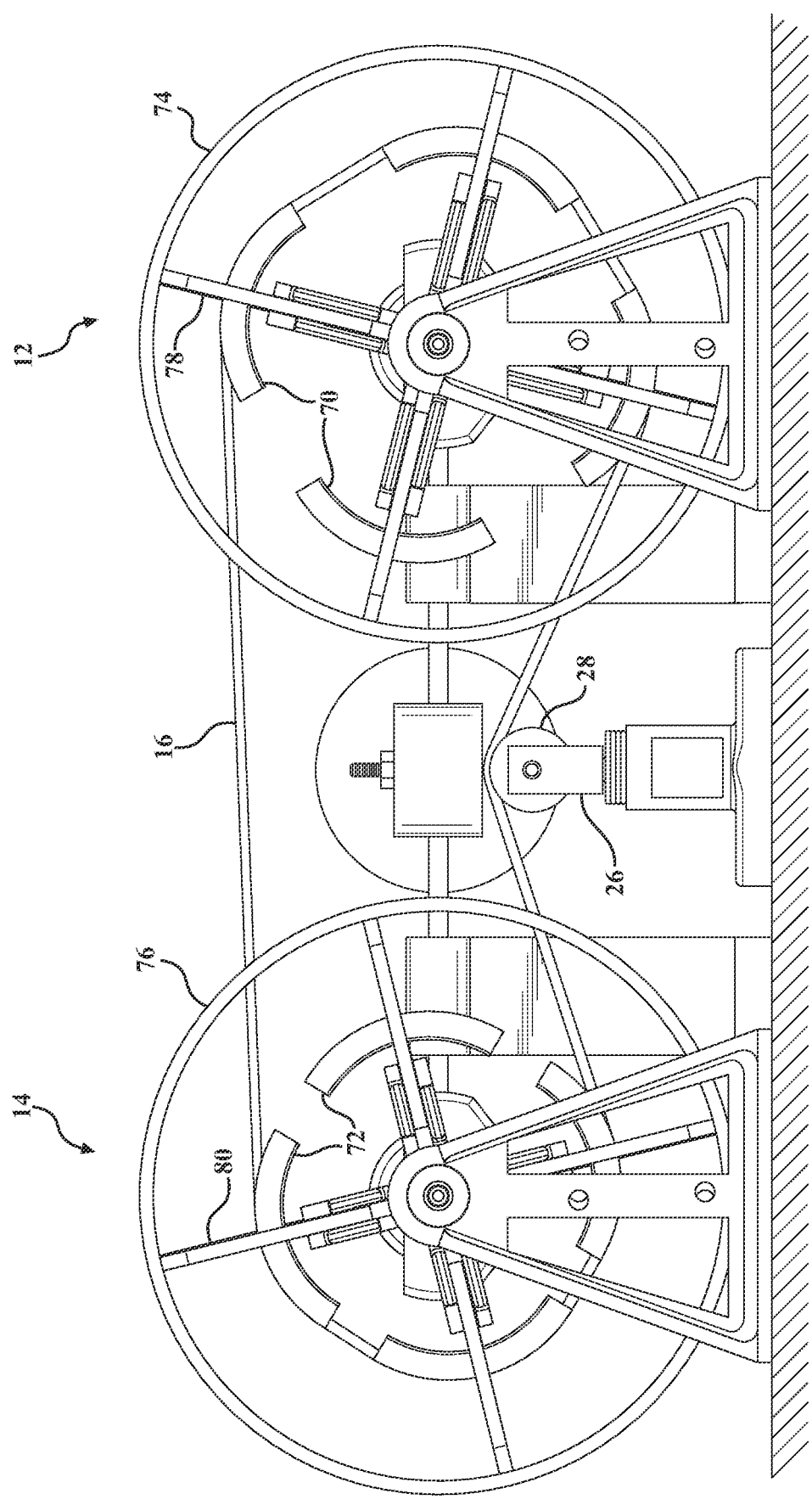
FIG. 5 is a further succeeding illustration to FIGS. 3-4 and depicting a maximum overdrive configuration in which the input pulley diameter defining segments are at a maximum diameter and the output pulley diameter defining segments are at a corresponding minimum diameter.

Proceeding to FIG. 3, a side plan view is provided of the continuously variable transmission and illustrating both the input 12 and output 14 pulleys in an intermediate collective diameter defining position (see relative circumferential defining position of individual pulley segments 70 and 72). FIGS. 3-5 are each shown approximately one hundred and eighty degrees rotated from what is shown in FIGS. 1-2 so that the input pulley 12 is located on the right side and the output pulley 14 being on the left side.

FIG. 4 is a succeeding illustration to FIG. 3 and showing the output pulley diameter defining pulley segments 72 in a maximum diameter defining position corresponding to an underdrive position. The input pulley segments 70 in FIG. 4 correspond to a minimum diameter defining position. In this configuration, the input variator/controller 18 axially displaces (pulls) the rotatably slaved and axially displaceable rotating elements 54/56 outwardly in opposite directions, via the left/right link arms 62/64, in a direction away from a centerline (see as shown at 82 in FIG. 2 which aligns with an arcuate defining recess corresponding to each pulley segment for receiving a location of the belt 16) of the keyed shaft 50, and in order to minimize a collective input pulley diameter established by the arrayed segments 70. Conversely, the output variator/controller 22 moves its corresponding rotating elements 58/60 inwards to a closest centerline position of the axis of rotation in order to outwardly displace the corresponding pulley segments 72 to the maximum diameter defining position.

FIG. 5 is a further succeeding illustration to FIG. 4 and depicts a maximum overdrive configuration in which the input pulley diameter defining segments 70 are at a maximum diameter defining configuration and the output pulley diameter defining segments 72 are at a corresponding minimum diameter defining configuration. This is accomplished by the variator/controllers 18 and 22 reversing the displacing motion of FIG. 4 for each of the respective pairs of left/right link arms 62/64 and 66/68 relative the connected pairs of rotary slaved and axially keyed shaft displacing rotating elements 54/56 and 58/60.

Figure 6:
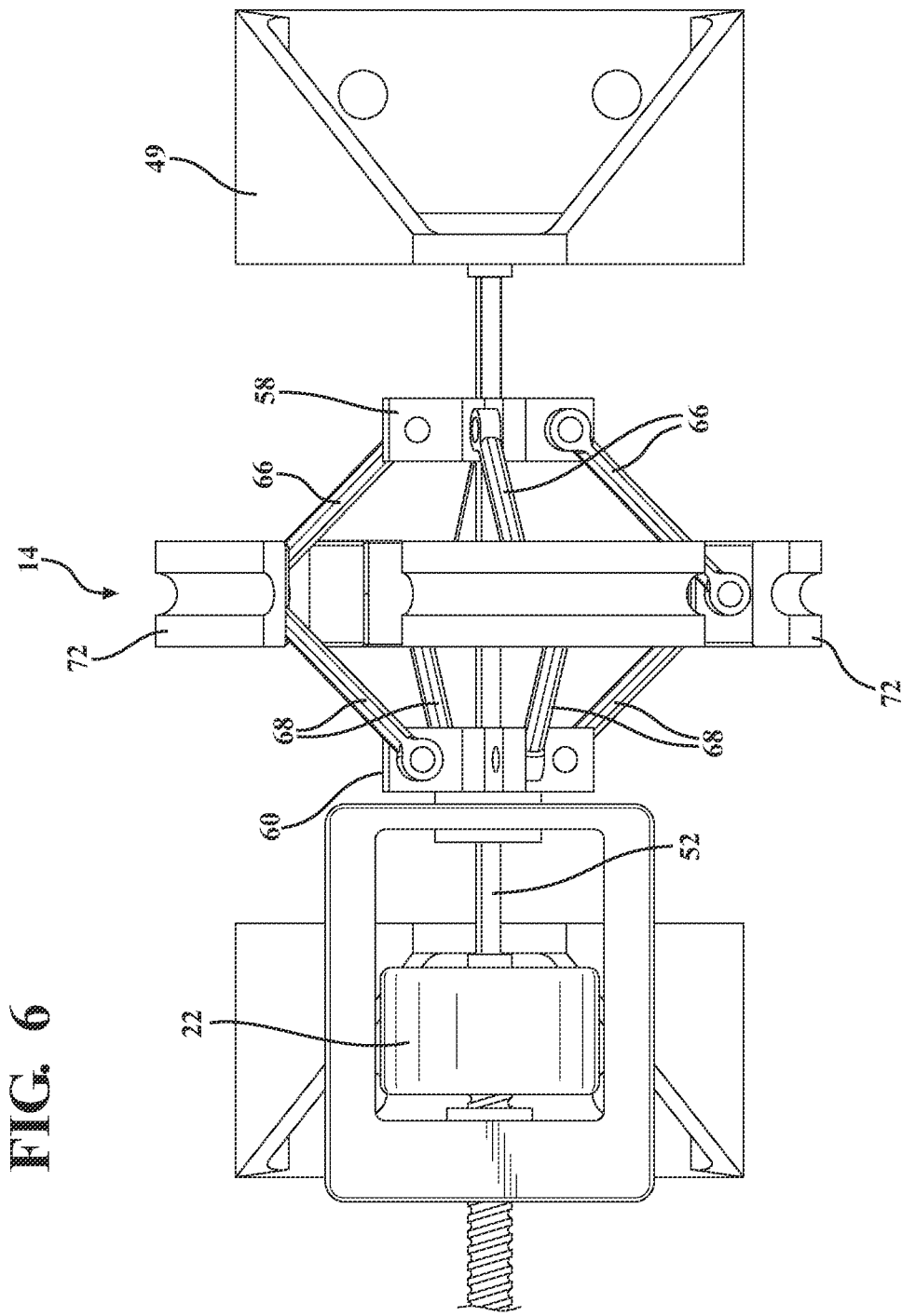
FIG. 6 is an overhead partial plan view of either of the input or output pulley subassembly and depicting the variator controller and gearbox actuating the circumferentially arrayed pulley segments to a maximum pulley diameter.
Figure 7:
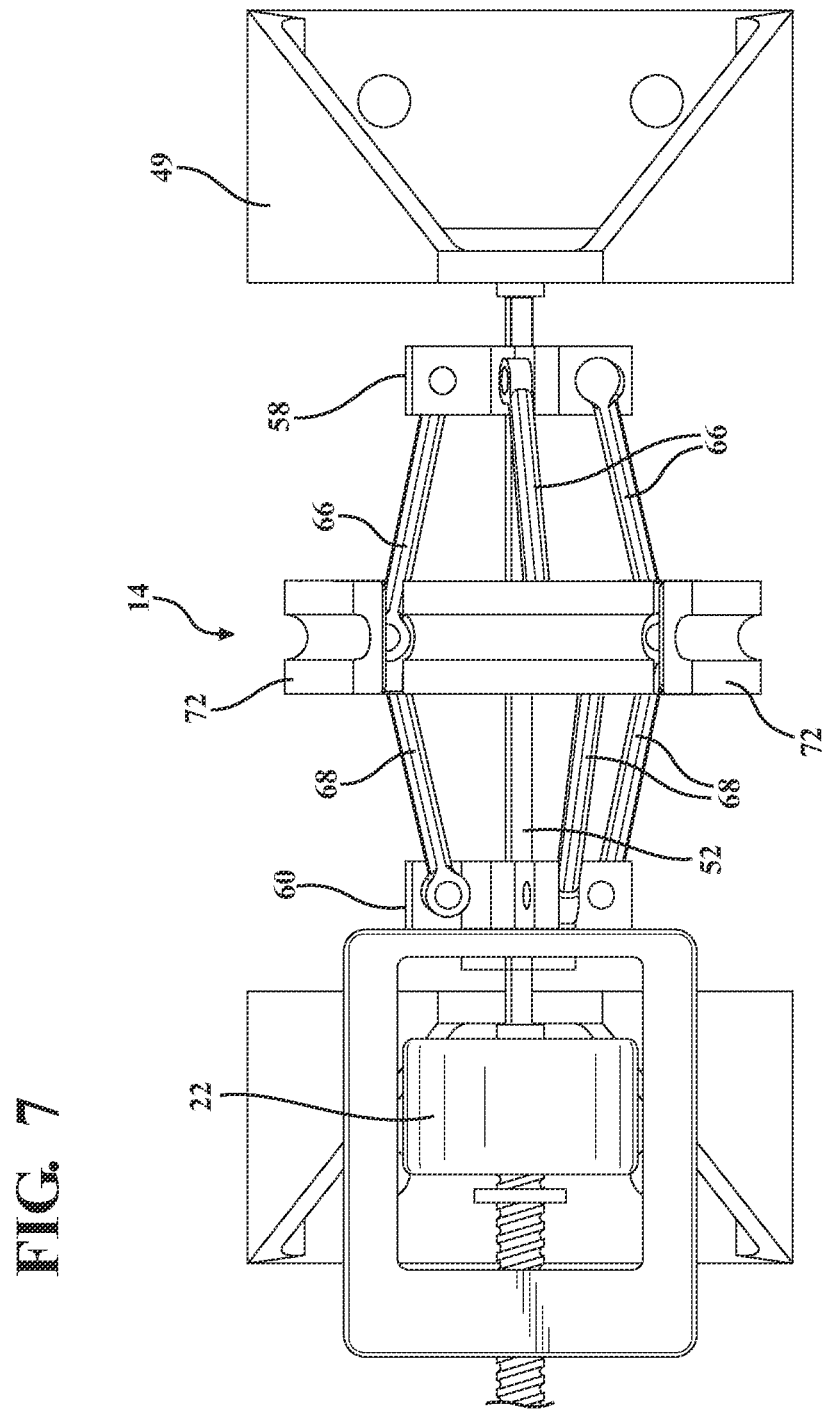
FIG. 7 is a succeeding view to that shown in FIG. 6 and depicting the pulley segments being actuated by the variator controller and gearbox to a minimum pulley diameter.

FIG. 6 is an overhead partial plan view of either of the input or output pulley subassembly (the output pulley 14 being shown) and depicting the corresponding variator controller 22 and gearbox actuating the circumferentially arrayed pulley segments 72 to a maximum pulley diameter, such as corresponding to the maximum underdrive configuration of FIG. 4. FIG. 7 is a succeeding view to that shown in FIG. 6 and depicting the pulley segments being actuated by the variator controller and gearbox to a minimum pulley diameter, such as further corresponding to the maximum overdrive configuration of FIG. 5.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A continuously variable transmission, comprising:
   an input pulley having a first subassembly supported upon a first rotatably driven shaft;
   an output pulley having a second subassembly supported upon a second rotatable shaft;
   a closed loop belt supported about said input and output pulleys;
   said input and output pulley subassemblies each further including pluralities of left and right link elements pivotally supported and extending from each of a plurality of pulley segments to each of axially spaced apart first and second shaft supported rotating elements for positioning said pulley segments in an outwardly circumferentially arrayed fashion about each of said first and second shafts;
   axial displacement of a first pair of said shaft supporting elements of said input pulley subassembly varying a collective diameter formed by said arrangement of pulley segments configured upon said input pulley subassembly;
   a variable controller designed to move each of input and output variators/controllers incorporated into said input and output subassemblies in such a way that they move opposite of one another, causing the diameter of a first of said pulleys to enlarge in diameter, and the other of said pulleys to correspondingly decrease in diameter, with the net effect causing the transmission to go from an under-drive ratio to an over-drive ratio or back in a smooth and continuously manner;
   each of said input and output variators/controllers further including a gearbox subassembly having input and output bevel gears; and
   concurrent axial displacement of a second pair of said shaft supporting elements in said output pulley subassembly inversely varying with said displacement of said first pair of shaft supporting elements for reciprocally varying a collective diameter formed by said arrangement of said pulley segments configured upon said output pulley subassembly, and in order to maintain a constant circumference of said belt supported about said segmented pulley segments for each of said input and output pulleys.

2. The invention of claim 1, further comprising a restraining cage including a plurality of rings configured about each of the input and output pulleys for constraining radial motion of said segmented pulleys during both enlarging and contracting motion.

3. The invention of claim 1, further comprising an idler component positioned between said input and output pulleys and in contact with said belt, said idler component being actuated by said variator controller between elevated and retracted positions in order to compensate for any centerline distance error in tensioning said belt during diameter varying actuation of said pulley segments.

4. The invention of claim 1, said variator/controllers each further incorporating any of mechanical, electro-mechanical, pneumatic or hydraulic actuating systems.

5. The invention of claim 1, said pulley segments each further comprising an arcuate portion exhibiting a centerline recess for receiving said belt.

* * * * *